May 10, 1966    H. R. BEELITZ ET AL    3,250,848
CONNECTIONS IN MULTILAYER CIRCUITS AND METHOD OF MAKING SAME
Filed Sept. 11, 1963    5 Sheets-Sheet 1

LEGEND:
▨ = CONDUCTOR
▩ = RESISTOR
✶ = DELETED CONNECTION

INVENTORS
HOWARD R. BEELITZ &
HANS F. SCHNITZLER
By
    Attorney

PUNCHED HOLE A TO BREAK CONNECTION BETWEEN TERMINAL AND COMMON LINE

PUNCHED HOLE B (SHOWN FILLED WITH METAL ALLOY RISER) TO PERMIT CONNECTION BETWEEN THE RISER AND THE TERMINAL ON THE NEXT LOWER CARD $i$.

INVENTORS
HOWARD R. BEELITZ &
HANS F. SCHNITZLER
BY
Attorney

May 10, 1966 H. R. BEELITZ ETAL 3,250,848
CONNECTIONS IN MULTILAYER CIRCUITS AND METHOD OF MAKING SAME
Filed Sept. 11, 1963 5 Sheets-Sheet 3

PUNCHED HOLE 'A' TO BREAK CONNECTION BETWEEN TERMINAL AND LINE

PUNCHED HOLE B' (SHOWN FILLED WITH METAL ALLOY RISER) TO PERMIT CONNECTION BETWEEN RISER AND THE TERMINAL ON THE NEXT LOWER CARD $i$.

INVENTORS
HOWARD R. BEELITZ &
HANS F. SCHNITZLER
By Samuel Cohen
Attorney

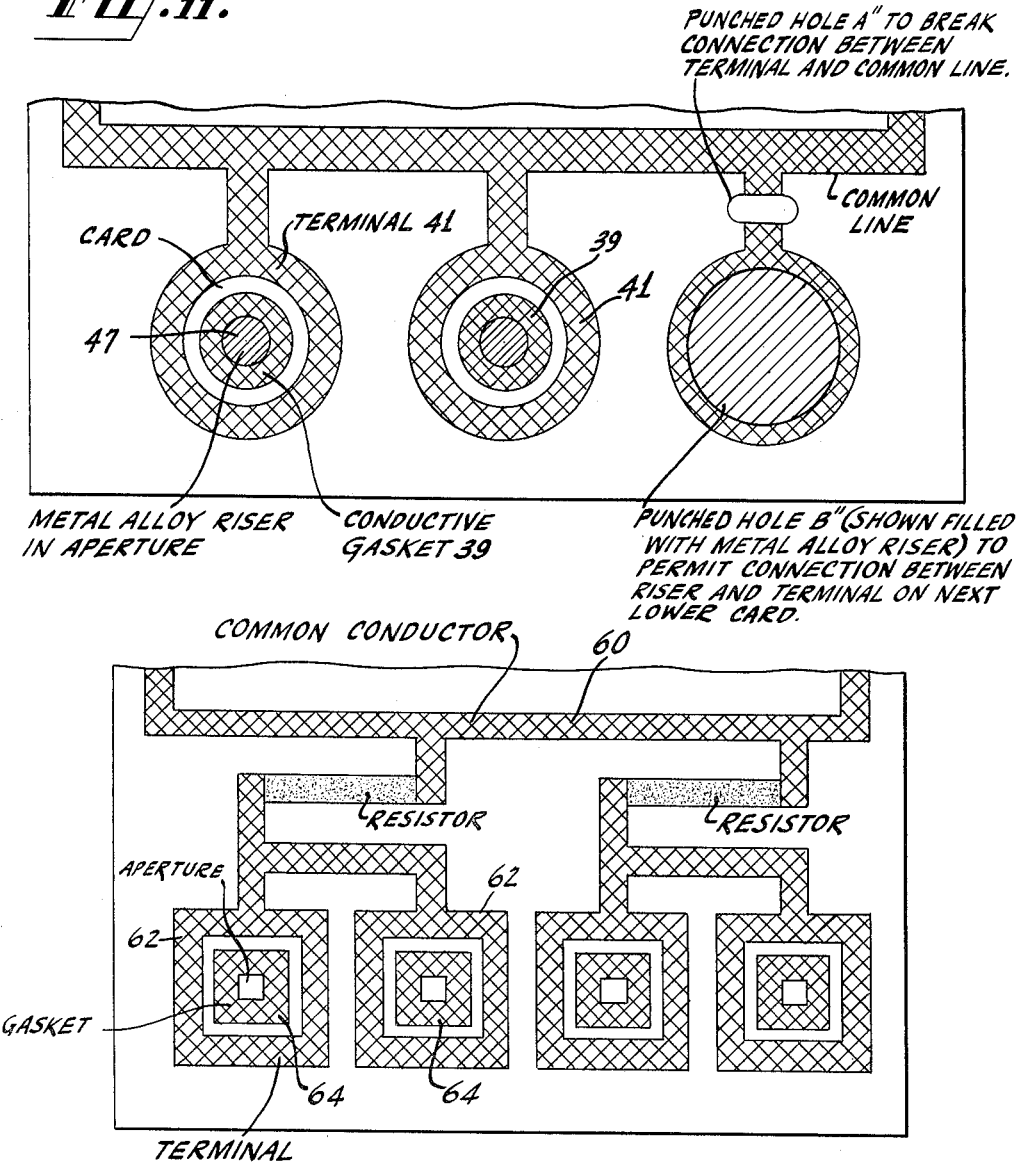

Fig.13.
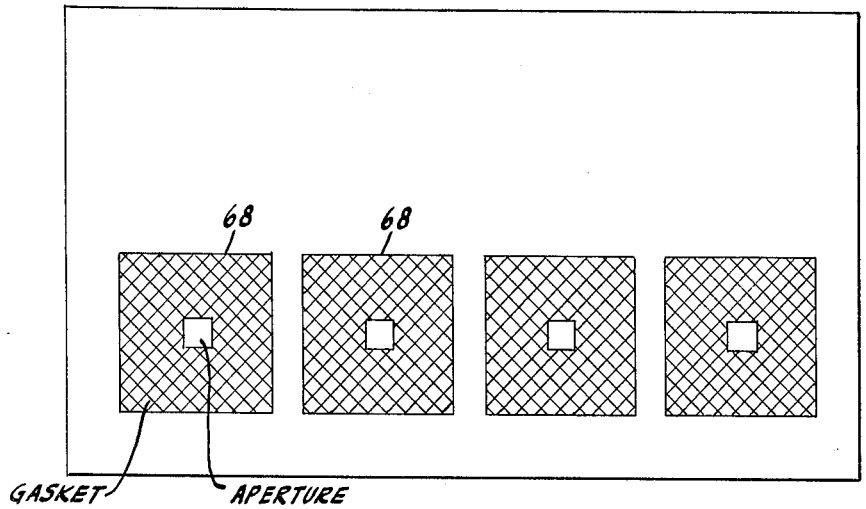
GASKET — APERTURE
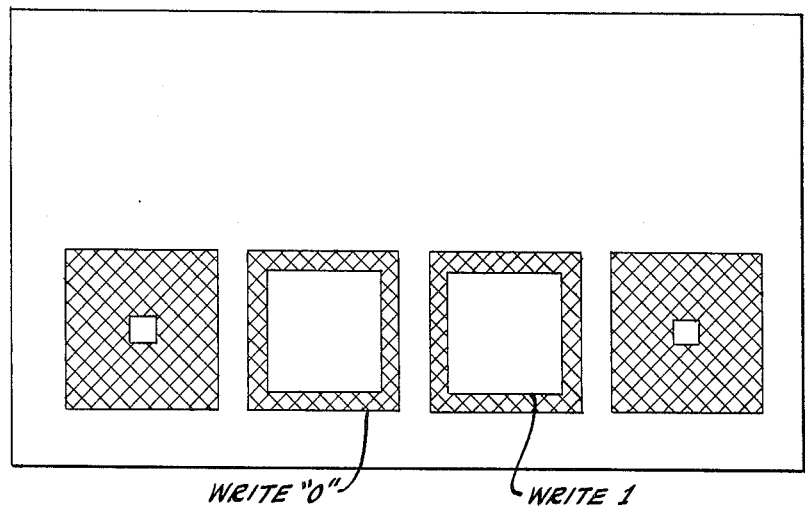
WRITE "0" — WRITE 1
Fig.14.

United States Patent Office 3,250,848
Patented May 10, 1966

3,250,848
CONNECTIONS IN MULTILAYER CIRCUITS AND METHOD OF MAKING SAME
Howard R. Beelitz, Franklin Park, and Hans F. Schnitzler, Levittown, N.J., assignors to Radio Corporation of America, a corporation of Delaware
Filed Sept. 11, 1963, Ser. No. 308,139
15 Claims. (Cl. 174—68.5)

This invention relates to the interconnection of electrical circuits, and, more particularly, to the interconnection of conductors printed on insulator substrates (such as "cards").

In the circuits of the invention, a terminal structure is employed which comprises a gasket on a card surrounding an aperture in the card. A conductive layer terminal adjacent to the gasket and on the opposite side thereof from the aperture connects to a conductor on the card.

In one embodiment of the invention, the cards are stacked one over the other with the apertures therein aligned. To make connection to a terminal on one card, at least a portion of the gasket and a portion of the terminal adjacent to the gasket are punched out of a second card immediately above the one card. Then a liquid conductor, such as an alloy having a relatively low melting point, is placed in the apertures as a riser lead. The liquid conductor passes into the punched out area and makes electrical contact with the terminal immediately beneath the second card. A second hold placed in the second card prevents the riser lead from making electrical contact with the conductors on the second card.

The invention is discussed in greater detail below and is shown in the following drawings of which:

FIG. 11 is a plan view of a card having still another type of terminal structure;

FIG. 12 is a plan view of a portion of a memory card using a terminal structure according to the invention;

FIG. 13 is a plan view of a spacer card employed with the memory card of FIG. 12;

FIG. 14 is a plan view of the same spacer card as in FIG. 13 with information written into the card.

Figure 1:
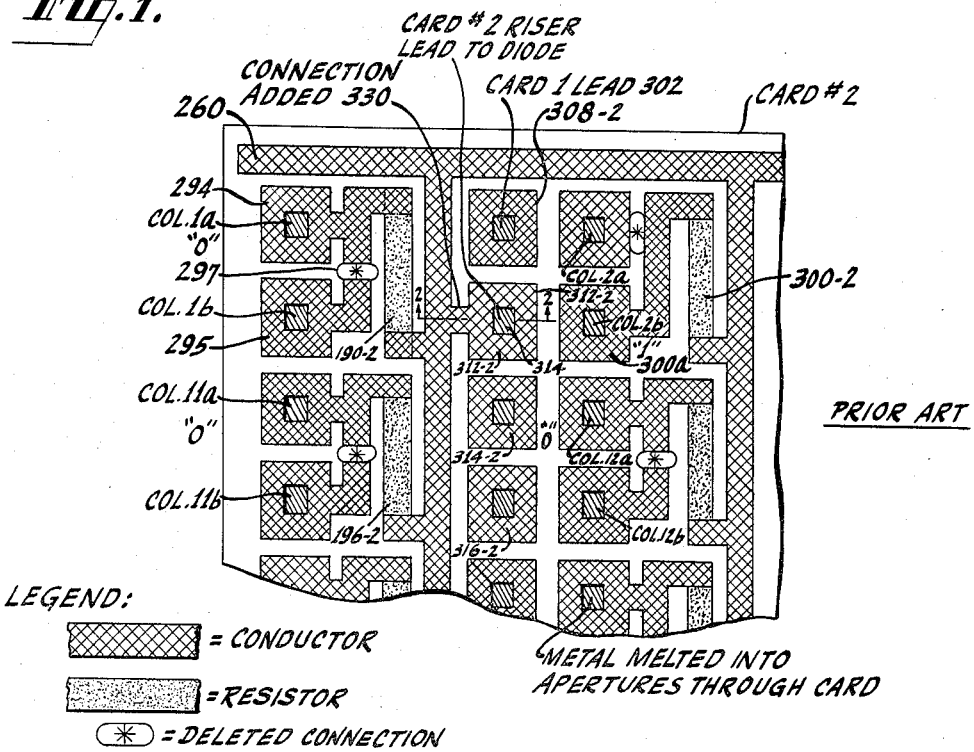
FIG. 1 is a plan view of a portion of a prior art memory card.

The card shown in FIG. 1 is described in detail in co-pending application Serial No. 294,288, filed July 11, 1963 by one of the present inventors, H. R. Beelitz and assigned to the same assignee as the present application. In brief, the card of FIG. 1, only a portion of which is shown in the figure, is a memory circuit which is capable of storing binary bits. The storage elements are resistors such as shown at 190-2, 196-2, 300-2, and so on. These resistors are all connected at one end to a common row lead 260. Each resistor is initially connected at its other end to two terminals as, for example, 294 and 295.

Information is written into a card by punching holes in the card as is indicated by the asterisks. A hole disconnects one of the two terminals from the resistor. For example, the hole 297 disconnects terminal 295 from resistor 190-2. This resistor is therefore connected only to terminal 294 and so connected represents storage of the binary bit zero. The resistor 300-2, on the other hand, is connected to terminal 300-a and represents storage of the binary bit one.

The various terminals on the cards are connected to external circuits by means of riser columns such as columns 1a, 1b and so on. The riser columns are preferably made of low melting point metal alloy, such as a low melting point solder, which is poured into the aligned apertures in the cards. As an alternative, a conductive fluid, such as mercury, may be used instead, as discussed on pages 32 and 33 of the co-pending application mentioned above.

It is also desired to connect the common word line 260 on the various cards to circuits external of the cards. The terminals for the word line appear at 308-2, 312-2, 314-2, 316-2, and so on. Initially, these terminals are all disconnected from the word line 260. To connect a particular card word line to a particular riser lead for the word line, a connection is printed, painted or otherwise formed between the word line and the terminal. The word line 260 on the card shown is connected to terminal 312-2 by means of added connection 330.

Figure 2:
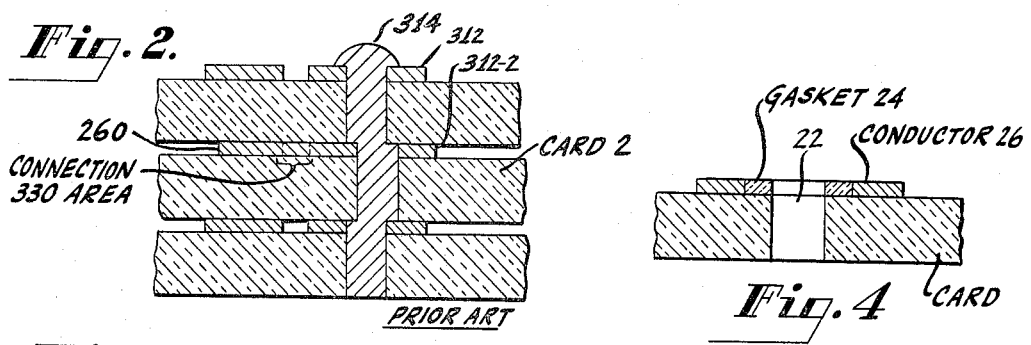
FIG. 2 is a section taken along line 2—2 of FIG. 1.

A cross-section through the card of FIG. 1 at the terminal 312-2 is shown in FIG. 2. The riser lead 314 connects to the terminal 312-2 which in turn is connected via the conductor area 330 to the common word line 260. The riser lead 314 also connects to corresponding terminals on the cards above and below card 2. However, these terminals, such as 312, are not connected to the common word lines 260 on their respective cards so that the riser 314 does not make connection to the common word lines 260 on the other cards.

As may be seen in FIG. 2, it is advantageous to stagger the terminals on the cards with respect to one another in order to achieve larger area contact between the riser lead and the terminal.

As a practical matter, it is easier to punch a hole in a card then to place a conductive connection, such as described above, on the card. The copending application mentions that it is possible initially to connect all of the terminals such as 308-2, 312-2, and so on, to the common word line 260 and to then disconnect all but one of the terminals by punching holes through all but one of the connections between the terminals and the word line. However, as mentioned there, this requires a specially designed punch or typewriter which must simultaneously punch a large number of holes (over 100 in the example discussed) and is somewhat inconvenient.

Figure 3:
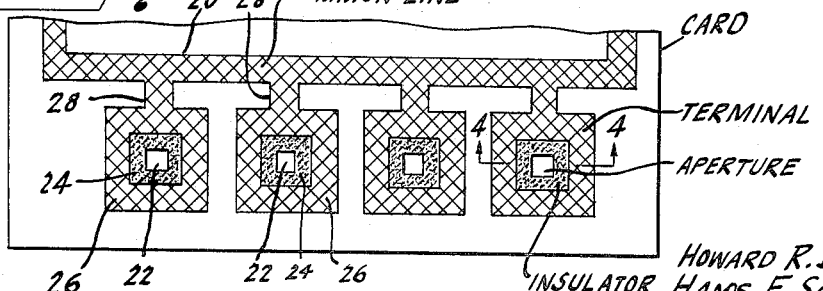
FIG. 3 is a plan view of one form of terminal structure according to the present invention.

In the arrangement described herein, a different terminal structure is employed and a connection is achieved to the terminal structure on any card simply by punching two holes in the card immediately above. Only a portion of such a card according to one embodiment of the invention is illustrated in FIG. 3, the common line being shown at 20. The memory elements or other circuit components on the card connected to the common line 20 are not illustrated. A plurality of apertures 22 are formed in the card. Each aperture is surrounded by an insulator gasket 24 and each gasket is surrounded by a conductive terminal 26. The terminal is connected to the common line 20 by the conductor 28.

A cross-section along line 4—4 of FIG. 3 appears in

Figure 4:
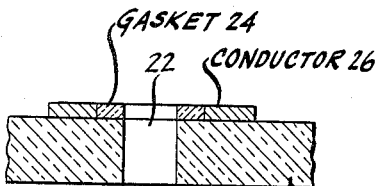
FIG. 4 is a cross-section taken along line 4—4 of FIG. 3.

FIG. 4. The terminal 26 and also the lines 20 and 28 are thin layers which are stenciled, silk screened, printed, or otherwise formed on the card. The insulator gasket 24 is also a thin layer and may be applied by similar techniques. Suitable insulator materials include non conductive epoxy resins, polyvinyl chloride resins, etc. The card itself may be paper, plastic or the like.

Figure 5:
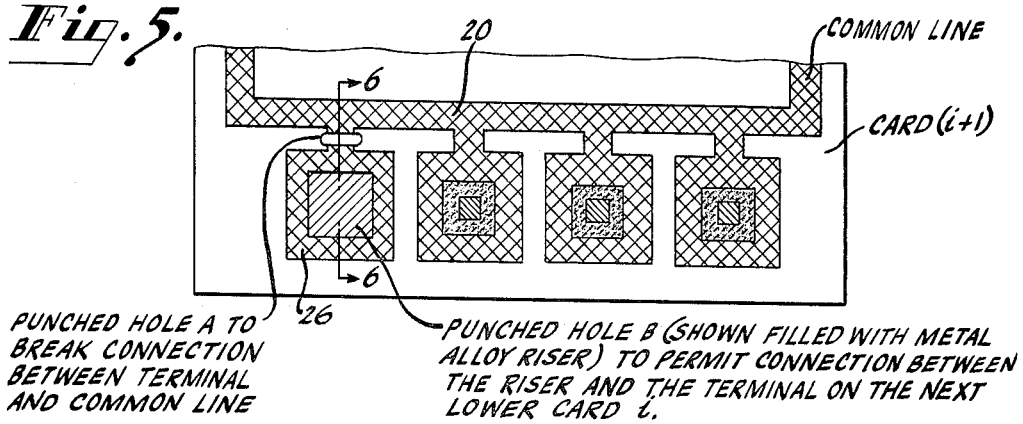
FIG. 5 is a plan view of the same card as appears in FIG. 3 but with holes punched in the card to permit connection to the terminal in the immediately lower card.
Figure 6:
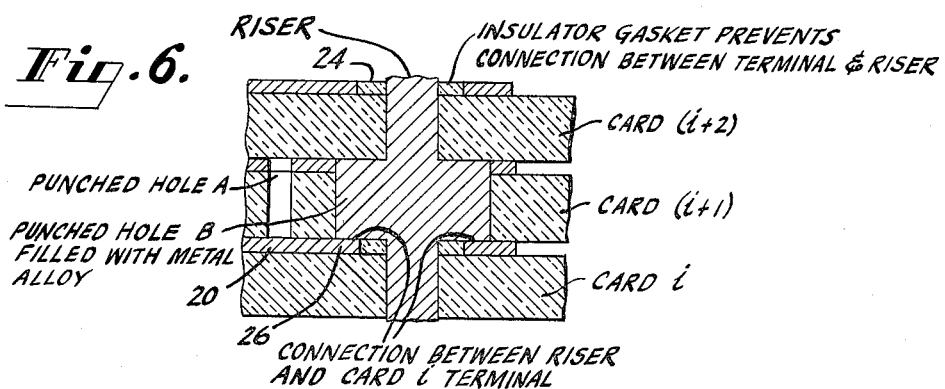
FIG. 6 is a section taken along line 6—6 of FIG. 5 and showing also the card above and the card beneath the card of FIG. 5.

The manner in which connection is achieved to a terminal on the card is illustrated in FIGS. 5 and 6. Two holes are punched in the $(i+1)^{th}$ card of a pack of cards in order to make connection to a terminal in the immediately lower card, that is, the $i^{th}$ card in the same pack. The punched hole A of FIG. 5 breaks the connection between the terminal 26 and the common line 20. The punched hole B removes the insulator gasket and preferably removes also a portion of the terminal 26.

After the cards have been punched, they are stacked one over another and a metal alloy riser is placed in the aligned holes in the cards. Various ways this can be done are discussed in the copending application above. The riser is prevented from making connection to the terminal 26 of the $(i+2)^{th}$ card by the insulator gasket 24. The gasket abuts the bottom surface of the $(i+3)^{th}$ card (not shown), in the general case in which the $(i+2)^{th}$ card is not the top one of the pack, and prevents the riser, when in the fluid state, from leaking between the cards. The riser does make connection to the terminal 26 on the $(i+1)^{th}$ card. However, the punched hole A breaks the connection between the terminal 26 and the common line 20 so that the riser is disconnected from the line 20 on the $(i+1)^{th}$ card. The punched hole B in the $(i+1)^{th}$ card permits the riser to make electrical contact with the terminal 26 and the common conductor 20 on the $i^{th}$ card as is indicated by the legend. The removal of a portion of the terminal 26 on the $(i+1)^{th}$ card allows for relatively large area contact between the riser and the terminal 26 on the $i^{th}$ card. Accordingly, it is not essential that the cards be staggered to insure such connection. However, if the insulator gasket is made sufficiently large it is permissible to stagger the cards without creating undesirable leakage paths.

The gaskets employed in the cards of FIGS. 5 and 6 are formed of insulating material. In addition, they are of rectangular shape. It is to be understood that the invention is not limited to the use of insulator gaskets or to rectangular shape. In the card arrangement shown in FIG. 11, for example, the gaskets 39 are formed of a conductive material rather than an insulator and are spaced from the terminals 41. Here, the same material is preferably used for the gasket 39 as for the terminal 41. This permits both the gasket and terminal to be formed simultaneously by screening, printing or the other means mentioned above, rather than in two separate steps as is required when an insulator gasket is used. In addition, the alignment and registration problem associated with two separate process steps are eliminated.

In the card of FIG. 11, insulation between the gasket and the terminal is achieved by the card itself. As already mentioned, the card is an insulator such as paper and prevents electrical condition between a riser such as 47 in the aperture and the terminal 41.

To illustrate that shapes other than square are possible for terminals and gaskets, the arrangement of FIG. 11 is shown to have annular elements. It is to be appreciated, of course, that square conductive terminals and square conductive gaskets may be used instead, similar to the arrangement of FIGS. 3 and 4, provided the gasket is spaced along its perimeter from the terminal.

The way in which the card may be punched to permit connection between a riser and a terminal beneath the punched card is illustrated at the right in FIG. 11. The various legends are self-explanatory. Except for the different construction, the explanation given for the arrangement of FIGS. 5 and 6 applies also to the terminal construction of FIG. 11.

Figure 7:
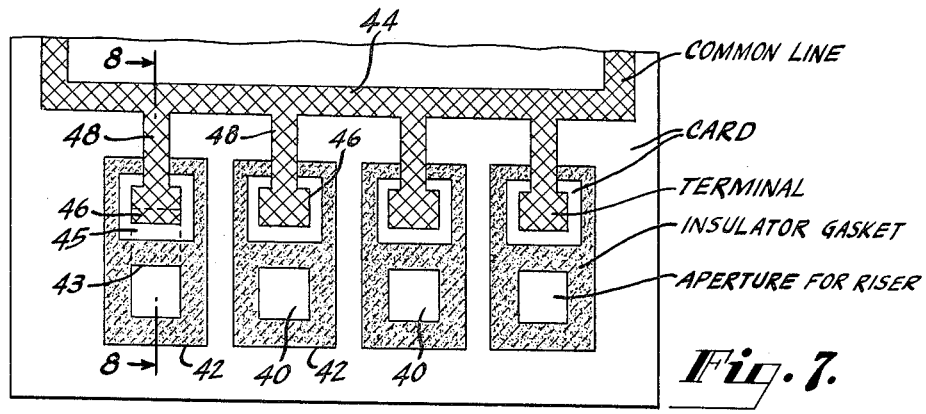
FIG. 7 is a plan view of another form of terminal structure according to the invention.
Figure 8:
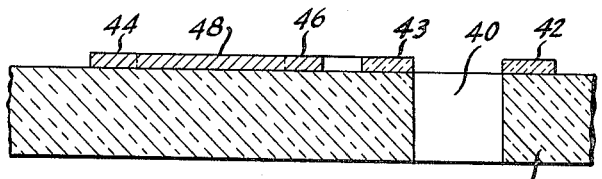
FIG. 8 is a section taken along line 8—8 of FIG. 7.

A third embodiment of the invention is shown in FIGS. 7 and 8. The cards are formed with apertures 40. An insulator gasket 42 surrounds each aperture. The common conductor is shown at 44 and it connects to a plurality of terminals 46. The insulator 42 serves also as a gasket for terminal 46 and abuts the conductor 48 between the common conductor 44 and terminal 46.

Figure 9:
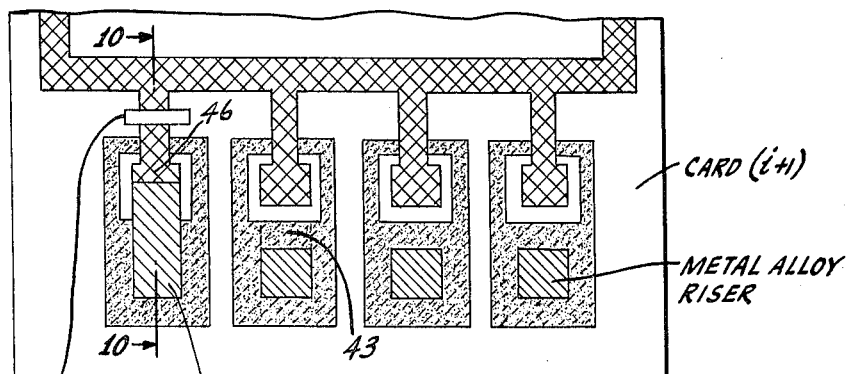
FIG. 9 is a plan view of the same card as appears in FIG. 7 with holes punched appropriately to make connection to the following card.

FIG. 9 illustrates the way in which a connection is made to a terminal. A first hole A' is punched through the card to break the connection 48 between the common line 44 and the terminal 46. At the same time, a second hole B' is punched through the card to remove a portion of the terminal 46 and to remove also the insulator bridge 43 (see FIG. 7) and the card area 45 between the aperture 40 and the remainder of terminal 46. The removed area B', indicated by dashes, is shown somewhat more clearly in FIG. 7.

Figure 10:
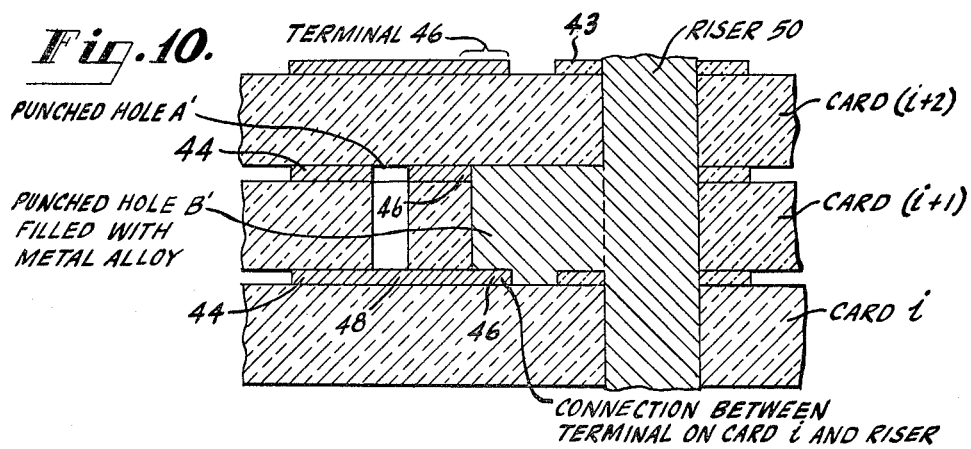
FIG. 10 is a section taken along line 10—10 of FIG. 9.

The stacked cards are shown in FIG. 10 with the riser 50 in place. The insulator gasket 42 prevents any connection between the terminal 46 on the $(i+2)^{th}$ card and the riser 50. The riser 50 does make electrical contact with the terminal 46 on the $(i+1)^{th}$ card. However, the punched hole A' disconnects this terminal 46 from the common line 44 on the $(i+1)^{th}$ card. The riser 50 makes electrical contact with the terminal 46 on the $i^{th}$ card and this terminal is connected to its common conductor 44. As in the previous embodiments, punching away a portion of the terminal 46 on the $(i+1)^{th}$ card permits the riser 50 to make contact with the terminal 46 on the $i^{th}$ card over a relatively large area. Accordingly, staggering of the cards is not necessary although it may be used, if desired.

While the invention has been illustrated in terms of memory cards, it should be appreciated that it is not limited to this application. As an example, in FIG. 10, one or more cards may have terminals such as described which connect to active electrical circuits embedded therein such as transistors, diodes or the like, and other cards may have terminals connected to other active elements or to a pattern of conductors which it is desired to connect to active elements on other cards. Techniques similar to those described may be used to make such connections. Connection between a riser column and a terminal on any card is achieved by punching holes in appropriate places in the card immediately above.

It is also possible using the techniques of the present invention to write information into the memory cards. This writing employs alternate memory and spacer cards. A portion of the memory card is shown in FIG. 12. The memory elements are resistors of the same type as illustrated in FIG. 1. Each resistor is connected at one end to the common conductor 60 and at its other end to two terminals 62. Within the terminals are gaskets 64 which may be made of a conductor as shown, of an insulator. When conductive gaskets are employed, they are spaced from the terminals around their perimeters, as shown. Each gasket surrounds an aperture.

A spacer card is shown in FIG. 13. It includes gaskets 68 having the same outer dimension as the terminals 62 on the card of FIG. 12 and each gasket abutting and surrounding an aperture.

Information may be written into the memory by punching holes in the spacer cards as indicated in FIG. 14. While either terminal can represent a one or zero, in the convention adopted, when the right terminal of a pair is punched, a zero is said to be written into a memory location and when the left terminal of a pair is punched, a one is said to be written into the memory location.

Figure 15:
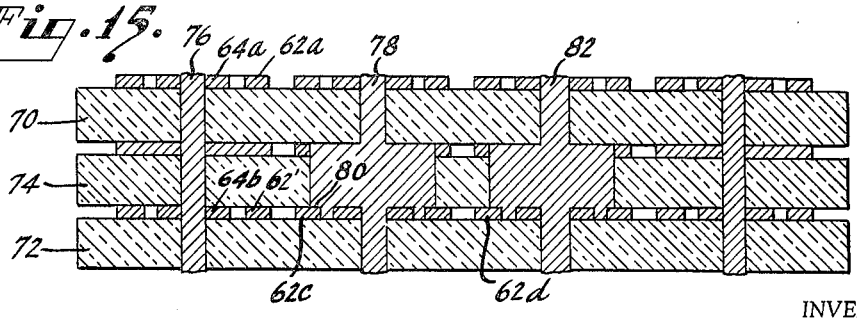
FIG. 15 is a cross-section through a portion of a stack of alternate spacer and memory cards.

A portion of a stack of cards is shown in FIG. 15. The cards with terminals and memory elements appear at 70 and 72 and the spacer card of FIG. 14 is shown at 74. The riser lead 76 is prevented from making electrical contact to the terminals 62a and 62b on cards 70 and 72, respectively, by the gaskets 64a and 64b. The riser 78 makes contact at 80 to the terminal 62c in card 72. In a similar manner, the riser 82 makes contact to the terminal 62d in card 72.

The terminals shown on the card of FIG. 12 are conductive, however, they could be insulator terminals instead, of the same type as shown in FIGS. 5 and 6. Moreover, the terminals could be annular rather than square or of some other geometry. In addition, it is possible with some cards to omit the gaskets entirely from the spacer cards such as 74. These spacer cards are formed with apertures which align with the apertures in the element cards.

An advantage of using spacer cards alternately with component bearing cards is that it is not necessary to stagger the cards or the terminals in order to achieve large contact areas. In addition, in cases in which the component bearing cards include fragile elements, these component bearing cards need not be punched and this lessens the possibility of damage to the fragile elements. As is clear from FIGS. 12–15, the writing-in process does not alter in any way the component bearing cards. Accordingly, in cases in which the cards are expensive, as, for example, in cases in which they may include relatively large numbers of transistors, tunnel diodes, or other relatively expensive elements, it is possible to reuse the cards.

What is claimed is:

1. A terminal structure for a conductor on an insulator card formed with an aperture comprising:
    a gasket on the card surrounding the aperture; and
    a conductive layer terminal surrounding the gasket.
2. A terminal structure as set forth in claim 1 wherein the gasket is conductive and is spaced from the terminal around its peripheral edge.
3. A terminal structure as set forth in claim 1 wherein the gasket is formed of an insulator.
4. A method of making connections to conductors on cards, wherein terminals on the cards are connected to the conductors and the cards are formed with apertures surrounded by gaskets between the terminals and the apertures, the steps of:
    punching a hole in one of the cards which removes a portion thereof at least abutting an aperture, which portion includes part of a given terminal and at least part of the gasket;
    stacking the cards one over another with the apertures therein aligned; and
    placing a conductive fluid in the aligned apertures.
5. A method of making connections to conductors on cards, wherein terminals on the cards are connected to the conductors and the cards are formed with apertures surrounded by gaskets between the terminals and the apertures, the steps of:
    punching a hole in one of the cards which removes a portion thereof at least abutting an aperture, which portion includes part of a given terminal and at least part of the gasket;
    punching a second hole in the same card to disconnect the same terminal from its conductor;
    stacking the cards one over another with the apertures therein aligned; and
    placing a conductive fluid in the aligned apertures.
6. A method of making connections to conductors on cards, wherein terminals on the surface of the cards are connected to the conductors and the cards are formed with apertures surrounded by gaskets between the terminals and the apertures, and located on the same surface of the cards as the terminals and conductors, the steps of:
    punching a hole in one of the cards which removes a portion thereof at least abutting an aperture, which portion includes part of a given terminal and at least part of the gasket;
    punching a second hole in the same card to disconnect the same terminal from its conductor;
    stacking the cards one over another with the apertures therein aligned and with corresponding terminals one over another;
    placing a molten metal conductor in the aligned apertures; and
    solidifying the molten metal conductor.
7. A terminal structure for a conductor on a card formed with an aperture comprising:
    a gasket layer located on one surface of the card and surrounding the aperture; and
    a conductive layer terminal on the same surface of the card as the gasket layer and spaced from the aperture by at least a portion of said gasket layer.
8. A terminal structure for a conductor on a card formed with an aperture comprising:
    an insulator layer first gasket on the card surrounding the aperture;
    an insulator layer second gasket on the card one portion of which is common with the first gasket; and
    a conductive layer terminal on the card substantially surrounded by said second gasket.
9. An arrangement of stacked cards formed with aligned apertures wherein:
    alternate ones of the cards are formed with conductors on a surface of the card leading to terminals on the same surface of the cards which surround apertures in the cards and which are spaced from the apertures by gaskets;
    the remaining cards are spacer cards formed with apertures which align with apertures in the other cards, some of said spacer cards being formed with apertures sufficiently large to expose the corresponding terminals on the immediately lower cards; and
    a relatively low temperature conductive alloy in the aligned apertures in the card.
10. An arrangement of stacked insulator cards formed with aligned apertures wherein:
    alternate ones of the cards are formed with thin conductor layers on a surface of the card leading to terminal layers on the same surface of the cards which surround apertures in the cards and which are spaced from the apertures by conductive gasket layers;
    the remaining cards are spacer cards formed with apertures which align with apertures in the other cards, some of said spacer cards being formed with apertures sufficiently large to expose the corresponding terminals on the immediately lower cards; and
    a relatively low temperature conductive alloy in the aligned apertures in the card.
11. A method of making connection to a terminal on surfaces of stacked cards with aligned apertures and each card having terminals spaced from and surrounding the apertures comprising the step prior to the stacking of the cards of:
    enlarging the aperture in one of the cards to an extent sufficient to expose the terminal on the immediately lower card; and the steps after stacking the cards of:
    placing a liquid conductor into the enlarged aperture; and
    solidifying the liquid conductor.
12. In an arrangement of stacked cards with aligned apertures and each card having terminals spaced by a gasket from and surrounding the apertures, the step prior to the stacking of the cards of:
    enlarging the aperture in one of the cards to an extent sufficient to expose the terminal on the immediately lower card; and the steps after stacking the cards of:
    placing molten metal into the enlarged aperture; and
    solidifying the molten metal.
13. A terminal structure for a conductor on a card formed with an aperture comprising:
    a terminal layer on the same surface of the card as the conductor and joined to the conductor and adjacent to said aperture;
    an insulator layer first gasket on the card surrounding the aperture, one portion of said gasket lying between the terminal layer and the aperture; and
    a second gasket on said card one portion of which comprises said one portion of said first gasket and which extends around said terminal layer and abuts the conductor, whereby said second gasket together with the portion of the conductor abutted by said second gasket surround said terminal layer.

14. A plurality of apertured cards arranged in a pack with corresponding apertures aligned, each card including:
   gaskets on the card surrounding some of the apertures therein and conductive layer terminals on the card, each terminal spaced from an aperture by the gasket surrounding that aperture; and
   at least some of said cards being also formed with one or more enlarged apertures, each enlarged aperture superimposed over an area on an adjacent card which includes an aperture, a portion of a terminal and at least a portion of the gasket between said aperture and said terminal.

15. A plurality of apertured cards arranged in a pack with corresponding apertures aligned and forming elongated openings through said pack;
   gaskets on the card surrounding some of the apertures therein and conductive layer terminals on the card, each terminal spaced from an aperture by the gasket surrounding that aperture;
   at least some of said cards being also formed with one or more enlarged apertures, each enlarged aperture superimposing over an area on an adjacent card which includes an aperture, a portion of a terminal and said aperture and said terminal; and
   conductors in the respective elongated openings in said pack which fill both the enlarged and unenlarged apertures forming said elongated openings.

References Cited by the Examiner

UNITED STATES PATENTS

| | | | |
|---|---|---|---|
| 2,990,310 | 6/1961 | Chan | 174—68.5 |
| 3,052,823 | 9/1962 | Anderson et al. | 174—68.5 X |

ROBERT K. SCHAEFER, *Primary Examiner.*

DARRELL L. CLAY, *Examiner.*